United States Patent [19]

Saito et al.

[11] Patent Number: 4,697,140
[45] Date of Patent: Sep. 29, 1987

[54] SEMICONDUCTOR INTEGRATED CIRCUIT HAVING A TEST CIRCUIT FOR TESTING AN INTERNAL CIRCUIT

[75] Inventors: Tadahiro Saito, Kawasaki; Kunihiko Gotoh, Kunitachi, both of Japan

[73] Assignee: Fujitsu Limited, Kawasaki, Japan

[21] Appl. No.: 828,188

[22] Filed: Feb. 11, 1986

[30] Foreign Application Priority Data

Feb. 20, 1985 [JP] Japan .................. 60-030190

[51] Int. Cl.$^4$ ............................................. G01R 31/28
[52] U.S. Cl. ......................... 324/73 R; 324/73 AT; 371/15
[58] Field of Search ........... 324/73 AT, 73 PC, 73 R; 371/15, 25

[56] References Cited

U.S. PATENT DOCUMENTS 4,329,640  5/1982  Reiner et al. .................. 324/73 AT
4,422,038 12/1983  Monma et al. ..................... 324/73 R

FOREIGN PATENT DOCUMENTS 2156863  5/1973  Fed. Rep. of Germany .... 324/73 R
0196469 11/1983  Japan ............................... 324/73 R
0222534 12/1983  Japan ............................... 324/73 R
0215047 12/1983  Japan ............................... 324/73 R

*Primary Examiner*—Reinhard J. Eisenzopf
*Assistant Examiner*—W. Burns
*Attorney, Agent, or Firm*—Staas & Halsey

[57] ABSTRACT

A semiconductor integrated circuit formed on a chip comprises an internal circuit and an oscillating circuit, the latter generating a fundamental clock signal and a frequency divided version thereof, for operating the former in a non-testing mode of operation. A pair of first and second external connection terminals is formed on the chip and respectively connected to the input and the output of the oscillating circuit. An external oscillator is selectively connected between the pair of terminals for operating the internal circuit in a non-testing mode. A reset signal input of the internal circuit is connected to a reset external connection terminal for receiving an externally applied reset signal which resets the internal circuit. A switching circuit is responsive to a predetermined level of each of respective input signals externally applied to the reset terminal and the second external terminal for rendering the oscillating circuit inoperative and for switching the switching circuit from a first position which supplies the frequency divided fundamental clock signal to the internal circuit in the non-testing mode, to a second position connected in common with the output of the oscillating circuit to the second external terminal for supplying a testing clock signal, selectively applied to the second external terminal in the testing mode, to the internal circuit.

6 Claims, 4 Drawing Figures

SEMICONDUCTOR INTEGRATED CIRCUIT HAVING A TEST CIRCUIT FOR TESTING AN INTERNAL CIRCUIT

BACKGROUND OF THE INVENTION (1) Field of the Invention

The present invention relates to a semiconductor integrated circuit having a test circuit for testing an internal circuit. More particularly, it relates to a semiconductor integrated circuit having a test circuit for high-speed testing of the functions of the internal circuit.

One of the uses to which such a semiconductor integrated circuit is put is as a DTMF (dual tone multi frequency)/pulse dialer provided in a telephone circuit; the dialer comprises two circuits, namely, a circuit for the DTMF dialer and a circuit for the pulse dialer, on one chip, and performs two functions selectively, namely, the function of a DTMF dialer and the function of a pulse dialer.

(2) Description of the Related Art

Generally, the semiconductor integrated circuit used as the above-mentioned DTMF/pulse dialer comprises an internal circuit having the circuit for DTMF dialer and the circuit for pulse dialer, and an oscillating circuit generating a fundamental clock signal for operating the internal circuit when the internal circuit is operated in a usual mode. Further, the semiconductor intergrated circuit has a predetermined number of pins (for example, eighteen) each of which functions as a terminal. In this connection, the pins are provided for several purposes: e.g., input pins for supplying input signals from a keyboard to the internal circuit in accordance with the operation of the keys provided on the keyboard; output pins for transmitting output signals from the internal circuit to a switching system; a pair of pins for the oscillating circuit which are connected to the input side and output side of the oscillating circuit respectively; a pin for supplying an external reset signal to the internal circuit; and a pair of pins for supplying power from a power source to the semiconductor intergrated circuit. The internal circuit operates as the DTMF dialer and as the pulse dialer selectively, in accordance with the control signal input from one of the input pins.

When the internal circuit operates as the DTMF dialer, the signal output from the internal circuit is an analog signal including frequency components corresponding to the operated key. Namely, the frequency components are determined in accordance with the position (i.e., the row and the column) on the keyboard where the operated key is arranged. Thus, the analog signal sequentially including the frequency components in accordance with the sequentially operated keys is output from one of the output pins and transmitted to the switching system. In this connection, the operational speed of the DTMF dialer is high, and the circuit for the DTMF dialer provided in the internal circuit is operated by receiving a fundamental clock signal, the frequency of which is a high value of, for example, 3.58 m.c. (megacycles), from the above-mentioned oscillating circuit.

Contrary to this, when the internal circuit operates as the pulse dialer, the signal output from the internal circuit is a digital signal including a number of pulses which corresponds to the number indicated on the operated key. Thus, if three keys, numbered "1", "2", and "0", are sequentially operated, for example, the digital signal as shown in FIG. 4 is output from one of the output pins and transmitted to the switching system. In this connection, the operational speed of the pulse dialer is low compared to the operational speed of the DTMF dialer. As an explanation of this phenomenon regarding the signal shown in FIG. 4, each of the time lengths of the predigital pause $t_1$ and the interdigital pause $t_2$ is set to about 1 s. (sec), and the cycle time of one pulse $t_3$ is set to about 100 ms. (milli-sec). Therefore, it is necessary to operate the circuit for the pulse dialer provided in the internal circuit by using the clock signal, the frequency of which is a low value of, for example, 2 kc (kilocycles).

However, as described above, the frequency of the fundamental clock signal generated from the oscillating circuit is set to the high value of, for example, 3.58 ms., in order to operate the circuit for the DTMF dialer in the internal circuit. Therefore, it is necessary to supply the clock signal to the circuit for the pulse dialer in the internal circuit by dividing the frequency of the fudamental clock signal, generated from the oscillating circuit, through a frequency divider.

Under the above-mentioned background, in the prior art, when the tests of the functions of the internal circuit (especially the functions of the circuit for the pulse dialer in the internal circuit) are carried out, the above-mentioned clock signal obtained by dividing the frequency of the fundamental clock signal generated from the oscillating circuit is also used as the clock signal for testing. In this connection, it is necessary to perform several kinds of tests in order to test the functions of the internal circuit. Namely, it is necessary to test the function of each key in the DTMF dialer mode and in the pulse dialer mode by testing each key to determine whether or not the correct signal corresponding to the operated key is output from the predetermined output pin. In addition, it is also necessary to test the function of a redial key by determining whether or not the correct signal is output again when the redial key is operated.

However, in the prior art, as the internal circuit (especially the circuit for the pulse dialer) is operated by the above-mentioned clock signal, the frequency of which is divided through the frequency divider, in the test mode as well as in the usual mode, a problem arises in that a long time is needed to perform the several tests as above-mentioned, and as a result, the efficiency of the production is remarkably lowered, especially when the tests of the functions of the internal circuit are carried out during the process of mass production.

To solve this problem, consideration has been given to providing an exclusive terminal for testing besides the above-mentioned generally existing pin terminals and to supplying the clock signal for testing to the internal circuit through that exclusive terminal. However, in this case, it becomes necessary to provide an additional pin terminal for testing on each chip, and as a result, the size of the device is increased.

SUMMARY OF THE INVENTION

The present invention has been completed in order to solve the above-mentioned problems, and the object of the present invention is to test the functions of the internal circuit in the semiconductor integrated circuit at a high speed and thereby shorten the time for testing, without providing an additional terminal for testing but by using only certain of the conventional, generally existing terminals (namely, a reset terminal and a pair of terminals for the oscillating circuit).

To attain this object, according to the present invention, there is provided a semiconductor integrated circuit comprising an internal circuit; an oscillating circuit which generates a fundamental clock signal for operating the internal circuit when the internal circuit is operated in a usual mode; a pair of terminals respectively connected to the input side and the output side of the oscillating circuit, an oscillator connected between the above pair of terminals when the internal circuit is operated in the usual mode; a reset terminal through which a reset signal for resetting the internal circuit is supplied from an external source (i.e., from outside of the chip) to the internal circuit; and a switching circuit for operating the internal circuit in a test mode. The switching circuit supplies a clock signal for testing, applied from an external source (i.e., from outside of the chip), to the internal circuit through one of the above pair of terminals when signals having a predetermined level are supplied from corresponding external sources (i.e., from outside of the chip) to the other one of the above pair of terminals and the reset terminal.

According to the above construction of the present invention, it is possible to carry out the test for the internal circuit at a high speed by directly supplying the external clock signal having the predetermined frequency (i.e., from outside of the chip) to the internal circuit through one of the pair of input and output terminals for the oscillating circuit (e.g., the terminal connected to the output of the oscillating circuit, for example), when the signals having the predetermined level are supplied by the external source (i.e., from outside of the chip) to the other one of the above pair of terminals (i.e., to the terminal connected to the input side of the oscillating circuit, for the above, parenthetically noted example) and the reset terminal.

DESCRIPTION OF THE PREFERRED EMBODIMENTS

Figure 1:
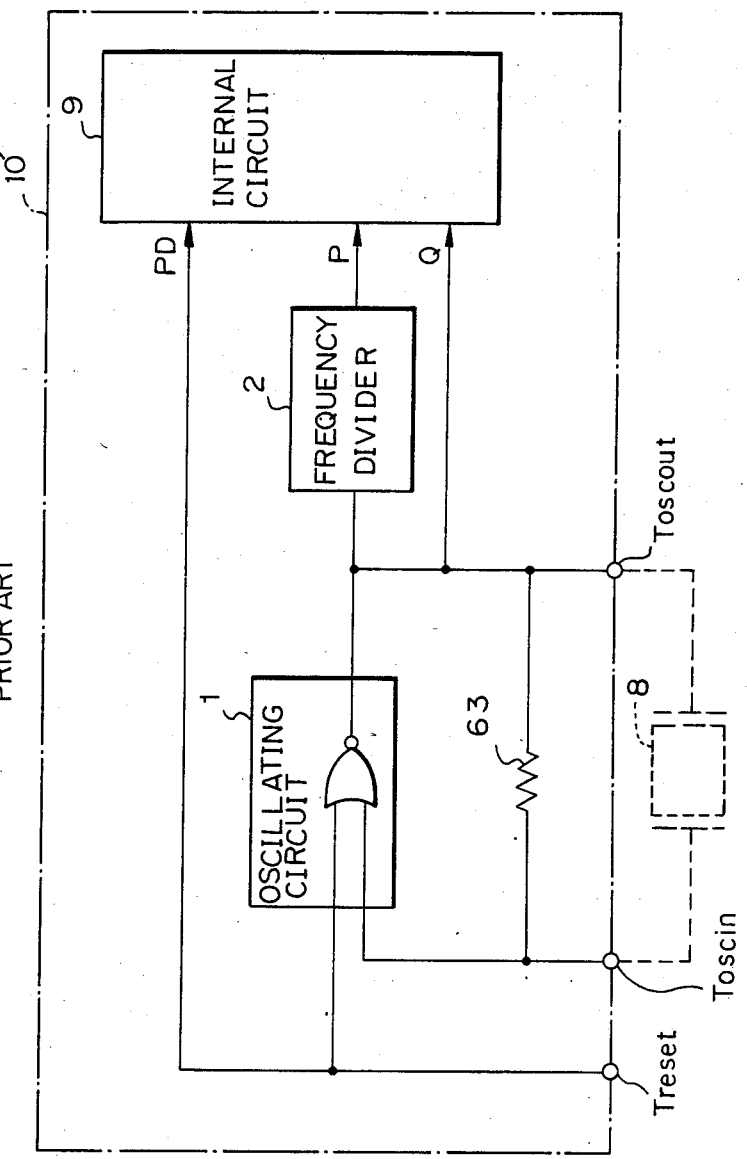
FIG. 1 is a circuit diagram illustrating an example of a prior art semiconductor integrated circuit.

In order to clarify the background of the present invention, an example of a prior art semiconductor integrated circuit having a test circuit for testing the internal circuit, such as the above-mentioned DTMF/pulse dialer, is shown in FIG. 1.

In FIG. 1, reference numeral 1 is an oscillating circuit which generates a fundamental clock signal having a frequency of, for example, 3.58 m.c. Reference numeral 2 is a frequency divider which divides the frequency of the fundamental clock signal generated from the oscillating circuit 1, and this frequency-divided clock signal is supplied through the signal path P to the internal circuit 9 to operate the circuit such as the pulse dialer provided in the internal circuit 9. The fundamental clock signal generated from the oscillating circuit 1 also is directly supplied through the signal path Q to the internal circuit 9 to operate the circuit such as the DTMF dialer provided in the internal circuit 9. Reference numeral 10' identifies a chip on which the semiconductor integrated circuit comprising the above-mentioned oscillating circuit 1, frequency divider 2, a feedback resistor 63, and internal circuit 9 are provided. A conventional, predetermined number of pin terminals are provided on the chip 10' for simplicity and clarity, however, only the three pin terminals which are here relevant (i.e., a reset terminal Treset and a pair of terminals, Toscin and Toscout which respectively are connected to the input side and the output side of the oscillating circuit 1) are shown in FIG. 1.

As is conventional, the circuit of FIG. 1 has both power-down and power-up states and, in the power-up state, both a testing mode and a normal, or usual, operating mode (hereinafter, the "usual" or "non-testing" mode), as now described.

When the internal circuit 9 is operated in the usual mode, the reset terminal Treset is set to a low level, and the oscillating circuit 1 is operated by connecting the oscillator 8 (a crystal oscillator, for example), which is outside of the chip 10', between the terminals Toscin and Toscout, respectively connected in turn to the input side and output side of the oscillating circuit 1. In this connection, a feedback resister 63 is connected between the input side and output side of the oscillating circuit 1, and the oscillating circuit 1 operates as, for example, a NOR gate.

The oscillating circuit 1 operates to generate a fundamental clock signal which is supplied through the frequency divider 2 and the signal path P to the circuit for the pule dialer provided in the internal circuit 9. The fundamental clock signal generated from the oscillating circuit 1 also is directly supplied through the signal path Q to the circuit for the DTMF dialer provided in the internal circuit 9. During this period, the power-down signal PD for the internal circuit 9 is set to a low level by setting the reset terminal Treset to a low level, and as a result, the internal circuit 9 is released from the power-down state and thus maintained in the power-up state.

When it is desired to set the internal circuit 9 to a power-down state, a predetermined high level signal is supplied externally (i.e., from outside the chip 10') to the reset terminal Treset. Thereby, the level of both the output side and input side of the oscillating circuit 1 becomes low, and as a result, the oscillating circuit 1 is brought to a reset state. Simultaneously, the power-down signal PD is set to a high level, and as a result, all parts of the internal circuit 9 are also reset to the initial power-down state (i.e., a non-operating state).

In such a prior art semiconductor integrated circuit, the above-mentioned clock signal obtained by dividing the frequency of the fundamental clock signal, generated from the oscillating circuit 1, through the frequency divider 2 is also used as the clock signal for testing, i.e., in the testing mode of the power-up state especially when tests of the functions of the circuit for the pulse dialer provided in the internal circuit 9 are carried out. Thus, as described above, a problem arises in that a long time is needed to perform the several kinds of tests, and as a result, the efficiency of the production is remarkably lowered, especially when the tests of the functions of the internal circuit 9 are carried out during the process of mass production.

Figure 2:
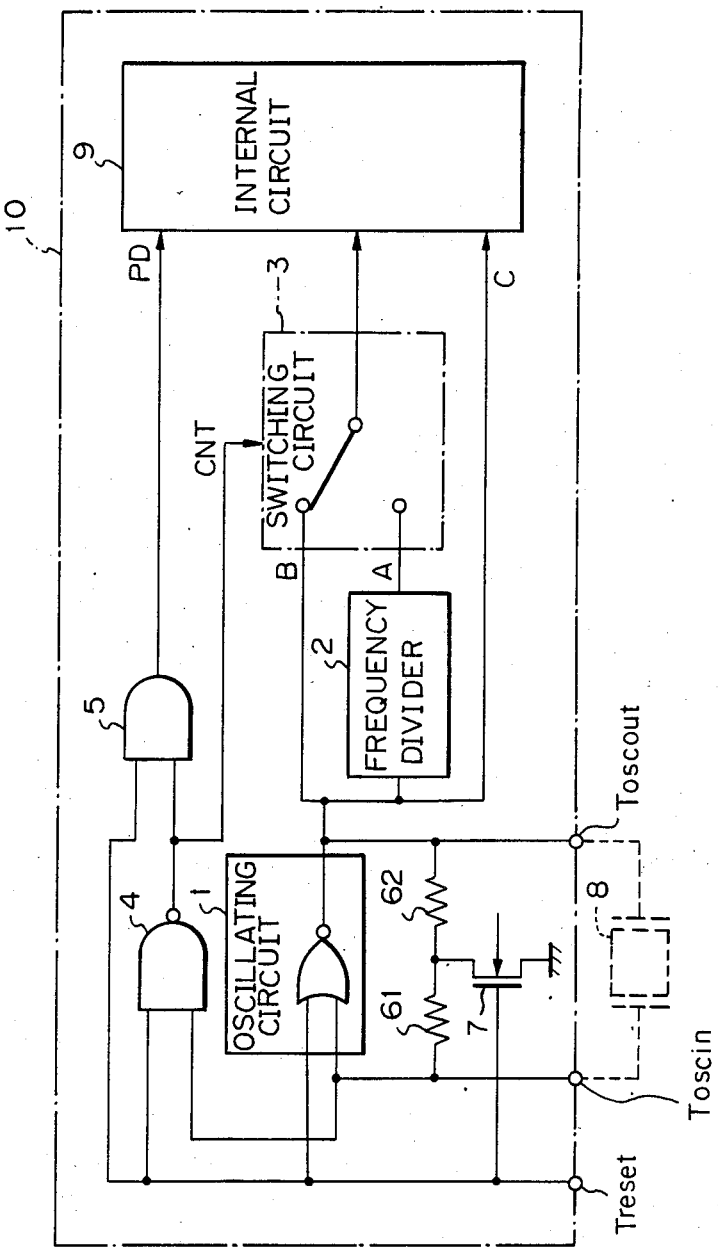
FIG. 2 is a circuit diagram illustrating one embodiment of the semiconductor integrated circuit according to the present invention.

The present invention has been attained in order to solve such a problem, and FIG. 2 shows a circuit diagram illustrating one embodiment of the semiconductor integrated circuit according to the present invention. As shown in FIG. 2, the semiconductor integrated circuit according to the present invention, comprises an oscillating circuit 1 generating the fundamental clock signal, having a frequency of, for example, 3.58 m.c.; the frequency divider 2; a switching circuit 3; a NAND gate 4; an AND gate 5; feed back resistors 61 and 62 respectively connected to the input side and output side of the oscillating circuit 1; an N channel type MOS transistor 7; and the internal circuit 9 such as the above-mentioned DTMF/pulse dialer; all of the foregoing components are provided on the same chip 10. A predetermined number of pin terminals are provided on the chip 10, but only three pin terminals (namely, a reset terminal, Treset, and a pair of terminals, Toscin and Toscout respectively connected to the input side and the output side of the oscillating circuit 1) are shown in FIG. 2. The switching circuit 3 switches two signal paths A and B selectively in accordance with the level of a control signal CNT output from the NAND gate 4 for testing.

When the internal circuit 9 is operated in the usual mode, and thus in the power-up state, the reset terminal Treset is set to a low level, and the oscillating circuit 1 is operated by connecting the oscillator 8 (a crystal oscillator, for example) from outside of the chip 10 between the terminals Toscin and Toscout which are connected respectively to the input side and the output side of the oscillating circuit 1.

In this usual mode since the reset terminal Treset is set to a low level, the outlet level of the NAND gate 4 (namely, the level of the control signal for testing CNT) becomes high. Then, the switching circuit 3 closes the signal path A in accordance with the high level of the above control signal CNT. Thus, the fundamental clock signal generated from the oscillating circuit 1 is supplied through the frequency divider 2 and the signal path A to the circuit for the pulse dialer provided in the internal circuit 9. Also, the fundamental clock signal generated from the oscillating circuit 1 is directly supplied through the signal path C to the circuit for the DTMF dialer provided in the internal circuit 9. Accordingly, as described above, the circuit for the pulse dialer in the internal circuit 9 is operated by the clock signal obtained by dividing the frequency of the fundamental clock signal, generated by the oscillating circuit 1, by the frequency divider 2, the resultant frequency of the frequency-divided clock signal being, for example, 2 k.c. In this connection, the internal circuit 9 operates as the DTMF dialer and as the pulse dialer selectively, in accordance with the control signal input from one of the input pin termnals not shown in the drawings.

Next, when the internal circuit 9 is set to the test mode in order to test the functions of the internal circuit 9, the oscillator 8 is disconnected from the terminals Toscin and Toscout, and the reset terminal Treset and the terminal Toscin connected to the input side of the oscillating circuit 1 are set to a high level, then a clock signal for testing, the frequency of which clock signal for testing is set to ½×3.58 m.c., for example, is supplied externally (i.e., from outside of the chip 10) to the internal circuit 9 through the terminal Toscout connected to the output side of the oscillating circuit 1.

In this case, namely, in the test mode, the output level of the NAND gate 4 (namely, the level of the control signal for testing CNT) is set to a low level by setting the terminals Treset and Toscin to a high level, and therefore, the switching circuit 3 closes the signal path B in accordance with the low level of the above control signal CNT. As a result, the clock signal for testing input to the terminal Toscout is directly supplied to the circuit for the pulse dialer provided in the internal circuit 9 through the signal path B, without passing through the frequency divider 2. Therefore, the tests of the functions for the pulse dialer can be carried out at a high speed by using the clock signal for testing having the frequency value of, for example, ½×3.58 m.c., as above-mentioned. Also, the above clock signal for testing is directly supplied to the circuit for the DTMF dialer provided in the internal circuit 9, through the signal path C, and therefore, the tests of the functions for the DTMF dialer also can be carried out at a high speed. In this connection, the tests for a part of the internal circuit 9 (a receiving circuit for a key input signal, for example) are carried out by the clock signal passing through the signal path B, even when the tests for the DTMF dialer are carried out. Also, in the test mode, since the input side of the oscillating circuit 1 is maintained at a high level as described above, the oscillating circuit 1 is brought to a non-operating (i.e., power-down) state, and further, as the output level of the AND gate 5 is set to a low level, the internal circuit 9 is released from the power-down state and thus maintained in the power-up state, as is necessary, of course, for the testing mode.

To set the internal circuit 9 to the power-down state, the reset terminal Treset is set to a high level, and thereby, the N channel type transistor 7 is turned ON. Therefore, both the input side and output side of the oscillating circuit 1 are set to a low level, and the oscillating circuit 1 is brought to a non-operating (i.e., power-down) state. Further, as the output level of the NAND gate 4 becomes high, the output level of the AND gate 5, namely, the level of the power-down signal PD, becomes high, and as a result, the internal circuit 9 is brought to the reset (i.e., the power-down) state by the above power-down signal PD having a high level.

Figure 3:
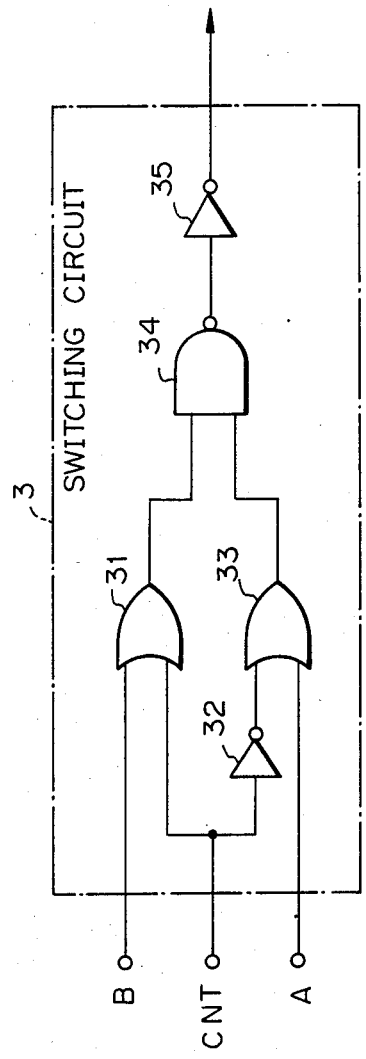
FIG. 3 is a circuit diagram illustrating an example of the switching circuit provided in the semiconductor integrated circuit shown in FIG. 2.
Figure 4:
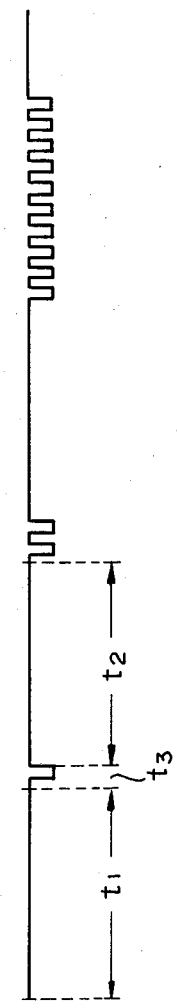
FIG. 4 is a diagram illustrating an example of the wave form of the output signal, which is output by the internal circuit provided in the semiconductor integrated circuit shown in FIG. 2.

FIG. 3 is a circuit diagram illustrating an example of the switching circuit 3 shown in FIG. 2. As shown in FIG. 3, the switching circuit 3 comprises OR gates 31, 33, a NAND gate 34, and inverters 32 and 35.

When the level of the control signal CNT output from the NAND gate 4 becomes high in the usual mode, the output level of OR gate 31 is maintained at a high level, and thus, the fundamental clock signal supplied from the oscillating circuit 1 through the frequency divider 2 and the signal path A is transmitted to the internal circuit 9 through the OR gate 33 and the NAND gate 34. In this connection, the clock signal output from the switching circuit 3 is brought into phase with the clock signal input to the switching circuit 3 by providing the inverter 35 connected to the output side of the NAND gate 34.

Contrary to this, when the level of the control signal CNT output from the NAND gate 4 becomes low in the test mode, the output level of OR gate 33 is maintained at a high level, and thus, the clock signal for testing supplied from outside of the chip through the terminal Toscout and the signal path B is transmitted to the internal circuit 9 through the OR gate 31 and the NAND gate 34. It is obvious that the clock signal output from the switching circuit 3 in the test mode also is brought into phase with the clock signal input to the switching circuit 3 by providing the inverter 35 connected to the output side of the NAND gate 34.

As described above, according to the present invention, it is possible to test the functions of the internal circuit provided in the semiconductor integrated circuit at a high speed during the process of production and to raise the efficiency of the production line without providing an additional and exclusive terminal for testing, thus avoiding an increase in the size of the device.

We claim:

1. A semiconductor integrated circuit formed on a chip, comprising:
   an internal circuit on said chip having plural inputs and operable in testing and non-testing modes;
   an oscillating circuit on said chip having an input and an output, said oscillating circuit generating a fundamental clock signal for operating said internal circuit in a non-testing mode of operation;
   a pair of external connection terminals formed on said chip and respectively connected to said input and said output of said oscillating circuit;
   means for selectively connecting an external oscillator between said pair of external connection terminals for operating said internal circuit in the non-testing mode and for connecting an external testing clock signal to the respective one of said pair of terminals connected to said output of said oscillating circuit for operating said internal circuit in the testing mode;
   a frequency divider on said chip having an input connected to said output of said oscillating circuit and an output and providing a divided, fundamental clock frequency at said output thereof;
   an external connection, reset terminal on said chip; and
   switching means on said chip connected to said external reset terminal and to the respective said terminal connected to said input of said oscillating circuit and responsive to a predetermined level of each of respective control signals selectively applied to said external connection reset terminal and said external connection terminal connected to said input of said oscillating circuit, for producing the testing mode of operation of said internal circuit and for rendering said oscillating circuit inoperative in the testing mode, said switching means further comprising a switching circuit having a first input connected to said output of said frequency divider and a second input connected to said output of said oscillating circuit, and an output connected to a corresponding input to said internal circuit, said switching circuit selectively connecting said first input thereof to said output thereof for supplying the divided fundamental clock signal from said frequency divider to said internal circuit in the non-testing mode, and said second input thereof to said output thereof for supplying the selectively applied external clock signal to said internal circuit in the testing mode of operation.

2. A semiconductor integrated circuit as recited in claim 1, further comprising:
   means on said chip for connecting said output of said oscillating circuit to a further, respectively corresponding input of said internal circuit.

3. A semiconductor integrated circuit as recited in claim 2, wherein:
   said internal circuit comprises a further, reset input and is responsive to a predetermined level of a control signal applied to said reset input for being reset; and
   said switching means further comprises a first logic circuit responsive to said predetermined level of each of said respective control signals applied to said reset terminal and said external connection terminal connected to said input of said oscillator circuit, for logically processing same and producing a control signal for selectively switching said switching circuit from said first input to said second input thereof.

4. A semiconductor integrated circuit as recited in claim 3, wherein:
   said switching means further comprises a second logic circuit responsive to said predetermined level of each of said respective control signals applied to said reset terminal and said external connection terminal connected to said input of said oscillator circuit, for logically processing same and producing the control signal applied to said reset input of said internal circuit for resetting same.

5. A method of operating a semiconductor integrated circuit between testing and non-testing modes in a power-up state and having a power-down state, said integrated circuit being formed on a chip and comprising an internal circuit on said chip having plural inputs, an oscillating circuit on said chip having an input and an output and generating a fundamental clock signal supplied at its output for operating the internal circuit in the non-testing mode, and a frequency divider on the chip for receiving the fundamental clock signal and providing a divided frequency, fundamental clock signal, and wherein a pair of first and second external connection terminals formed on the chip are respectively connected to the input and the output of the oscillating circuit and an external connection reset terminal is formed on the chip, said method affording high-speed testing of the internal circuit and comprising:
   (a) providing a switching circuit on the chip selectively switchable between a first position connected to the output of the frequency divider and a second position connected to said second external connection terminal;
   (b) applying a first control signal of a first logic level to the external connection reset terminal for establishing a power-up state of the integrated circuit, including the oscillating circuit and the internal circuit,
   (c) establishing a non-testing mode of operation in the power-up state by:
      (i) connecting an external oscillator circuit between said pair of external connection terminals for causing said oscillating circuit on said chip to generate the fundamental clock signal for operating said internal circuit;
      (ii) logically processing the first control signal of the first logic level applied to the reset external connection terminal and the logic level of the signal produced at the first external connection terminal with said external oscillator connected thereto, for supplying a second control signal of a first logic value of the switching circuit to switch same to said first position for supplying the frequency divided fundamental clock frequency to the internal circuit; and
      (iii) logically processing the first control signal having the first logic level and the second control signal having the first logic level for supplying a third control signal of a first logic level to the internal circuit for maintaining the internal circuit in a power-up state; and (c) establishing a testing mode of operation in the power-up state by:
  (i) disconnecting the external oscillator circuit from the first and second external connection terminals;
  (ii) applying a first control signal of a second logic level to said external connection reset terminal and a fourth control signal of a corresponding logic level to said first external connection terminal and logically processing same to produce the power-down state of the oscillating circuit on the chip, and to produce the third control signal of the first logic level for maintaining the power-up state of the internal circuit and the second control signal of a second logic level for switching the switching circuit to its second position and thereby to connect the internal circuit to the second external connection terminal; and
  (iii) applying a testing clock signal of a higher frequency than the divided frequency, fundamental clock signal to the second external connection terminal and thereby through the switching circuit, as switched to its second position, for operating the internal circuit.

6. A method as recited in claim 5, further comprising:
applying the first control signal of a second logic level to the external connection reset terminal and the fourth control signal of a respective, opposite logic level to the first external connection terminal for switching the semiconductor integrated circuit, including the oscillating circuit and the internal circuit to a power-down state.

* * * * *

UNITED STATES PATENT AND TRADEMARK OFFICE
CERTIFICATE OF CORRECTION

PATENT NO. : 4,697,140

DATED : September 29, 1987

INVENTOR(S) : SAITO et al.

It is certified that error appears in the above-identified patent and that said Letters Patent is hereby corrected as shown below:

Col. 4, line 26, change "in turn" to --, in turn, --;

line 35, change "pule" to --pulse--;

line 53, after "initial" insert --,--.

Signed and Sealed this

Third Day of May, 1988

Attest:

DONALD J. QUIGG

Attesting Officer

Commissioner of Patents and Trademarks